Patented Dec. 12, 1933

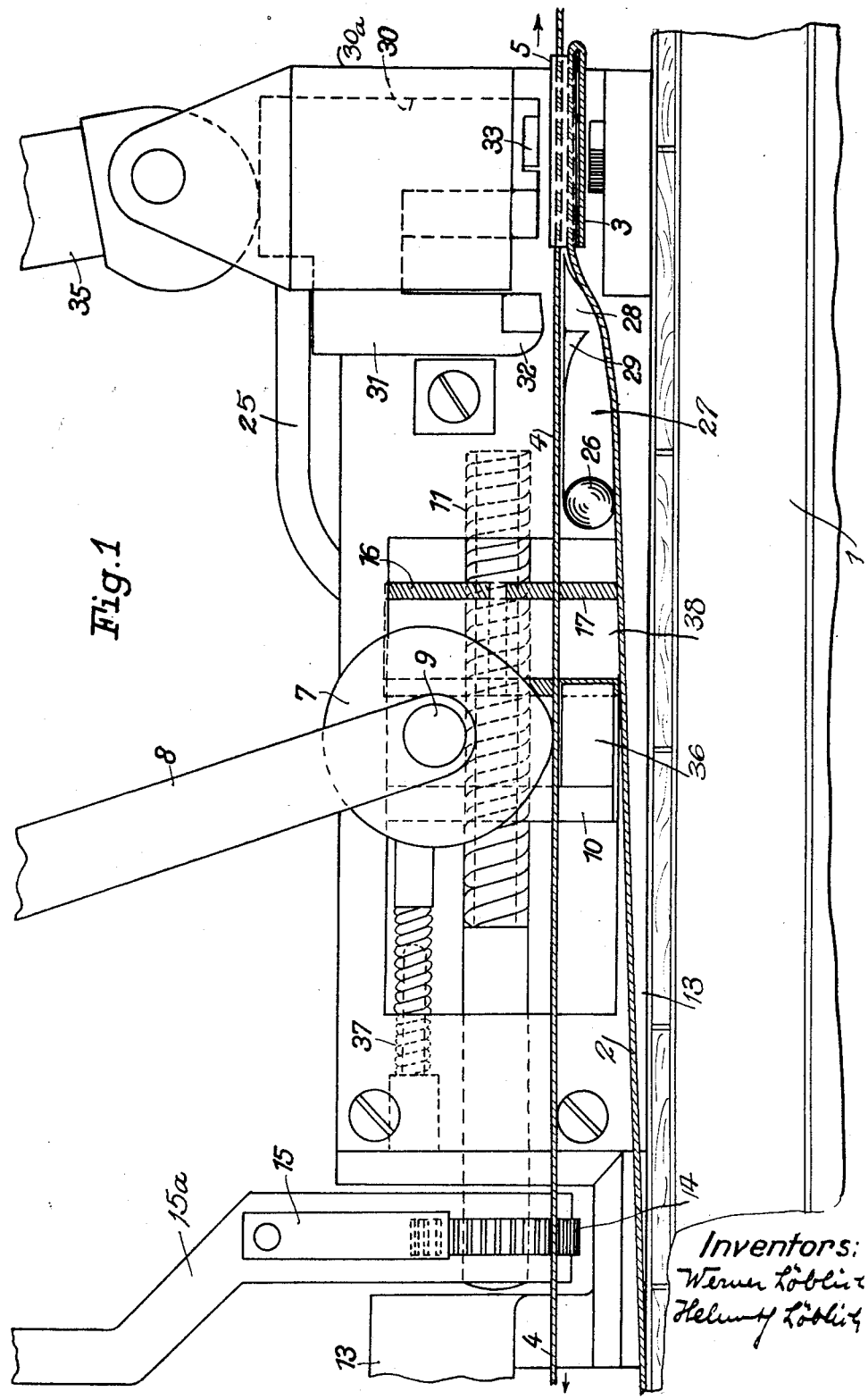

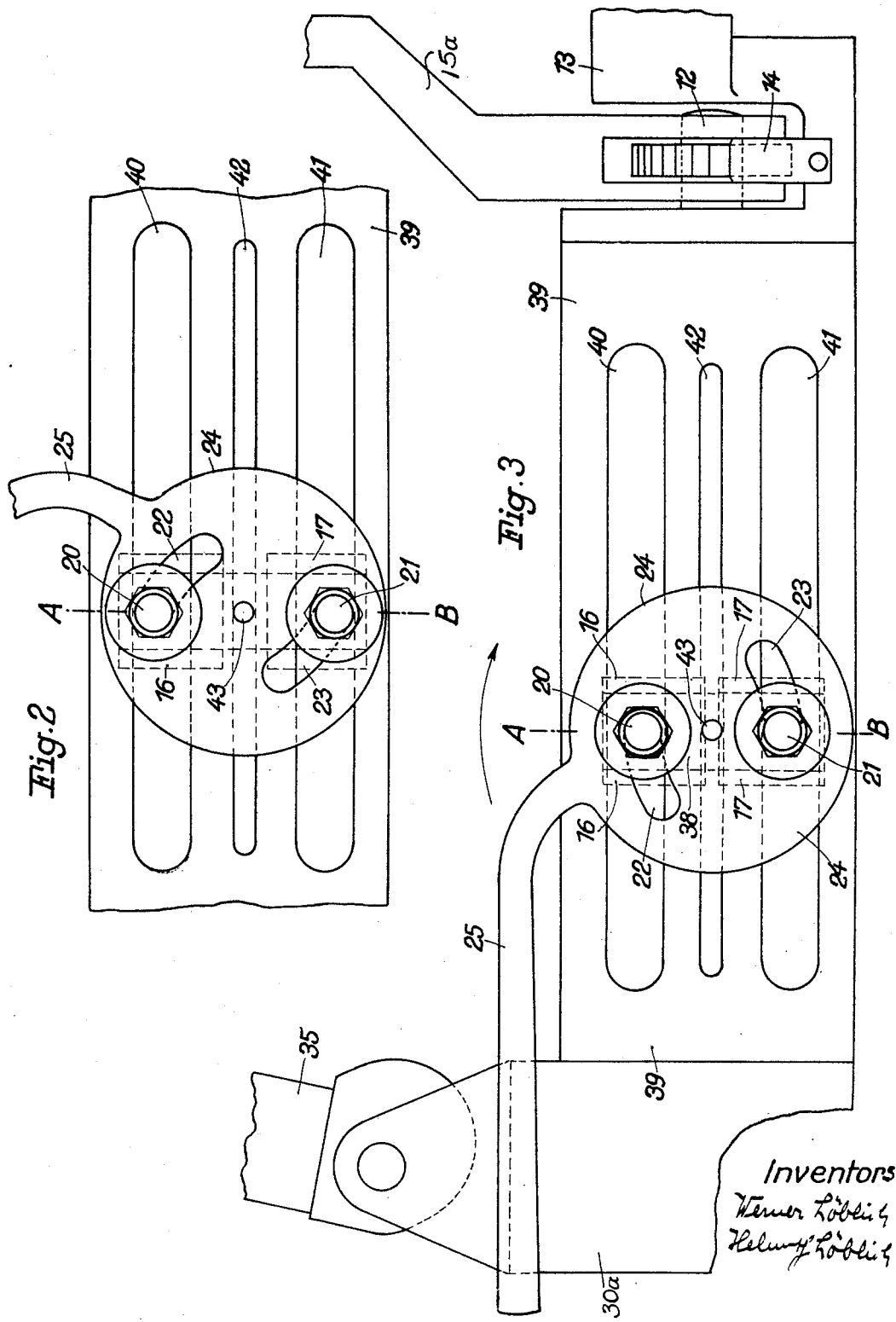

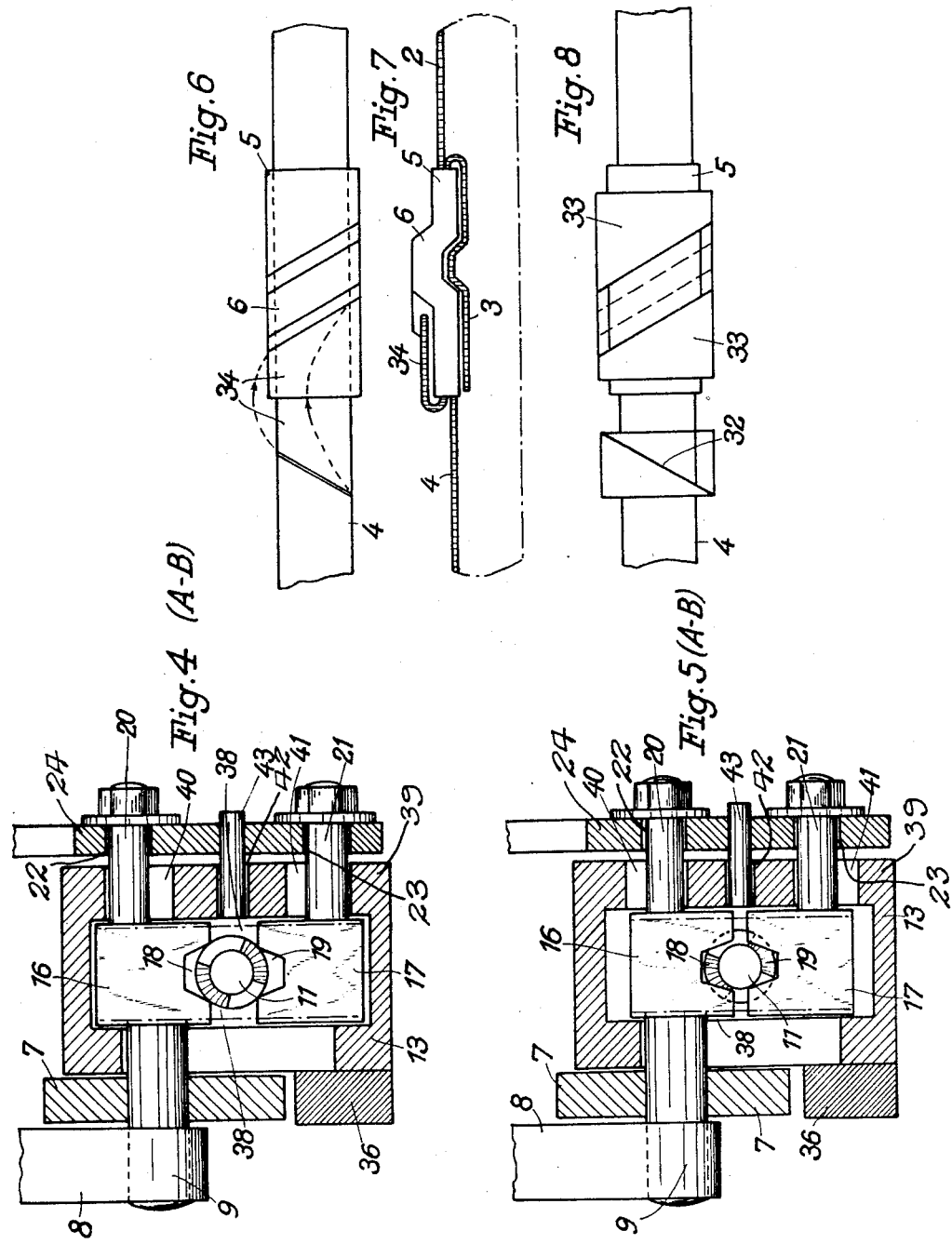

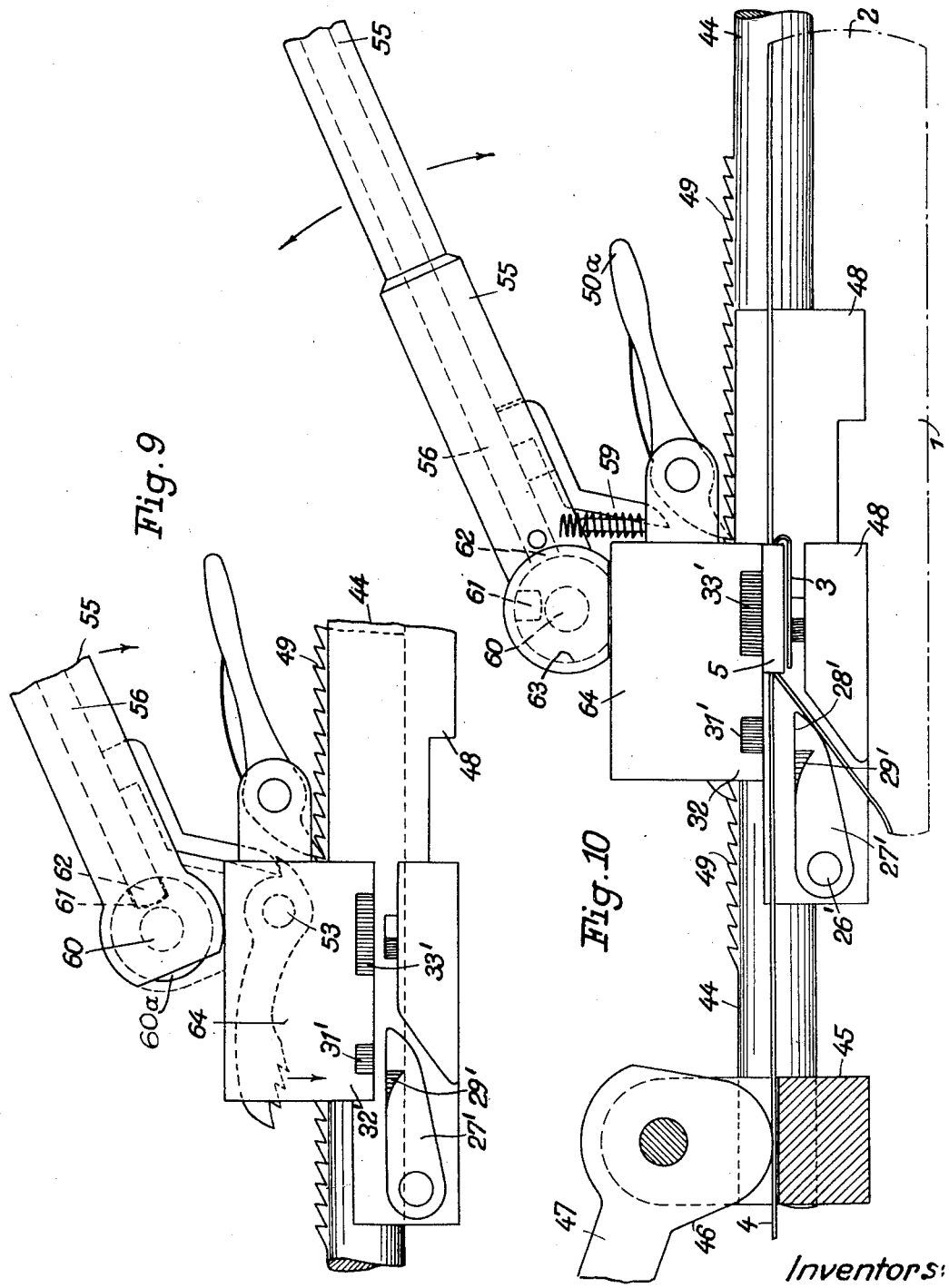

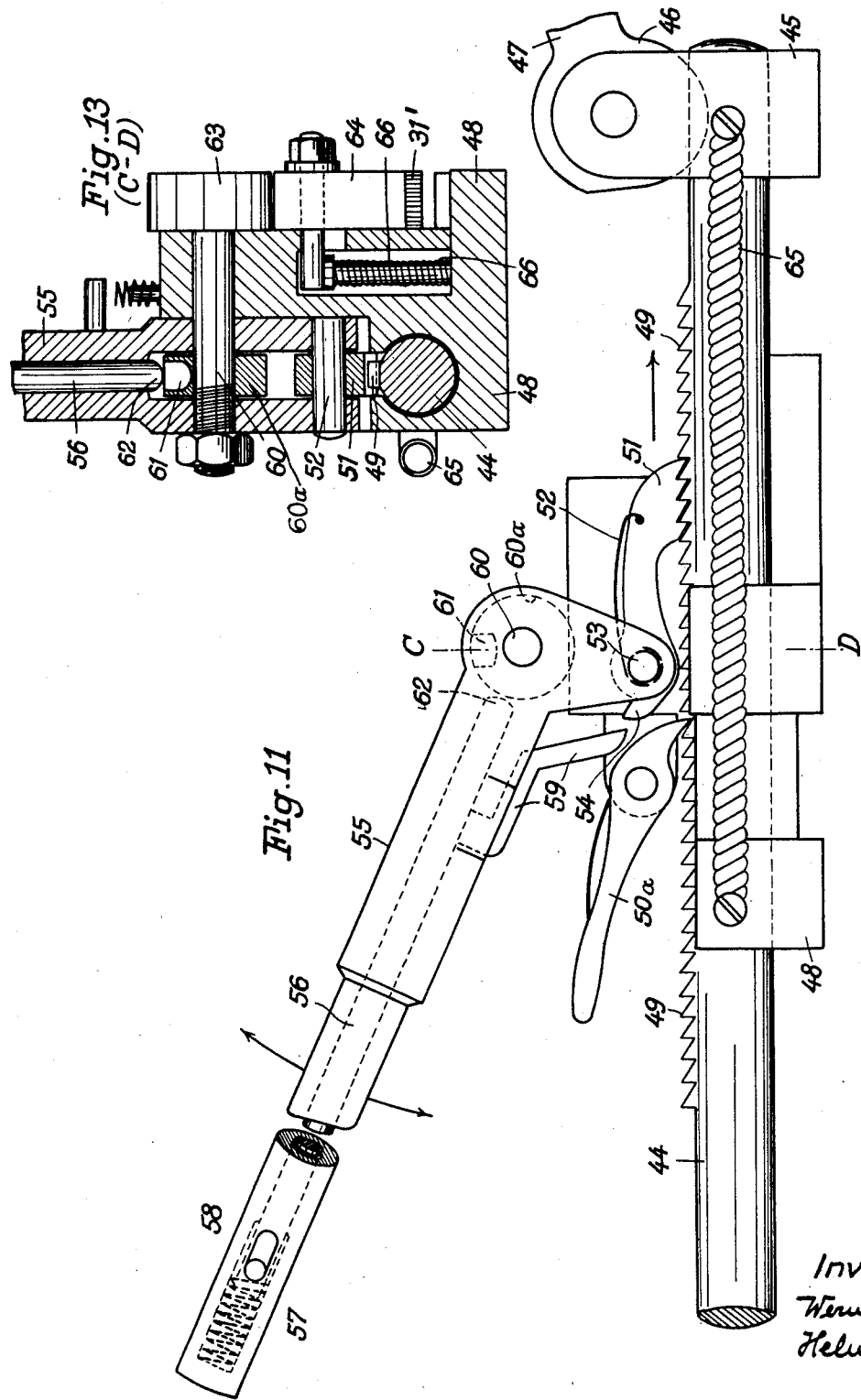

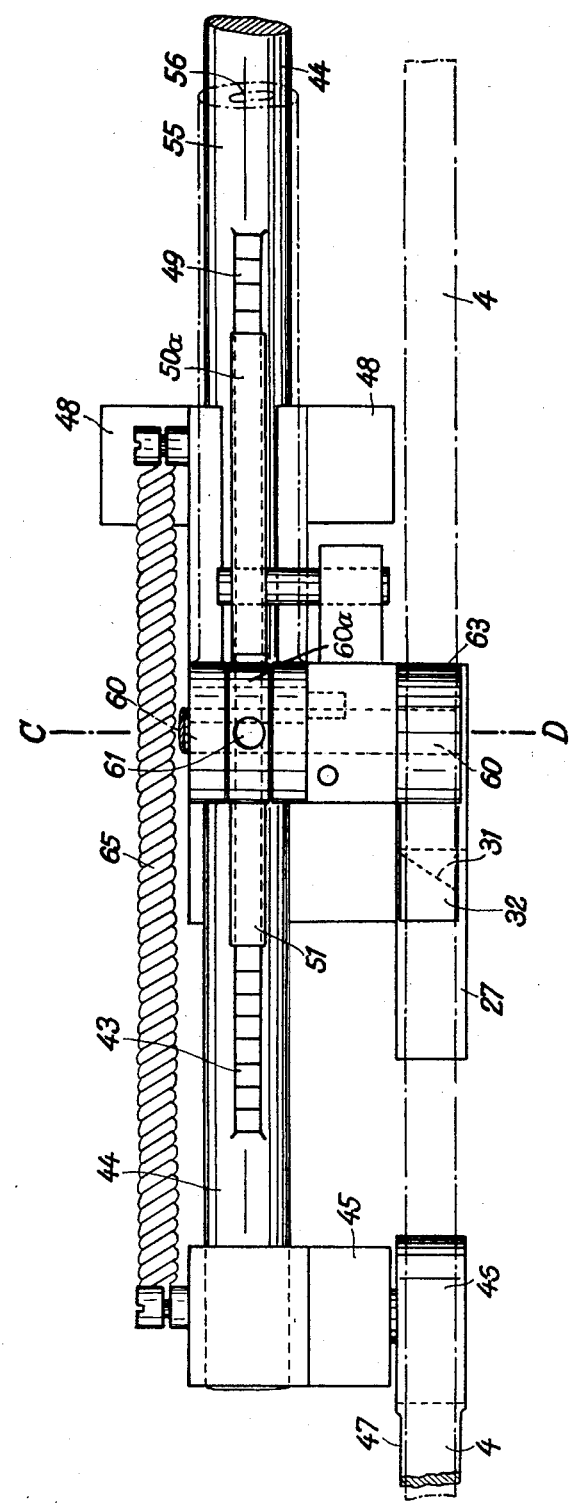

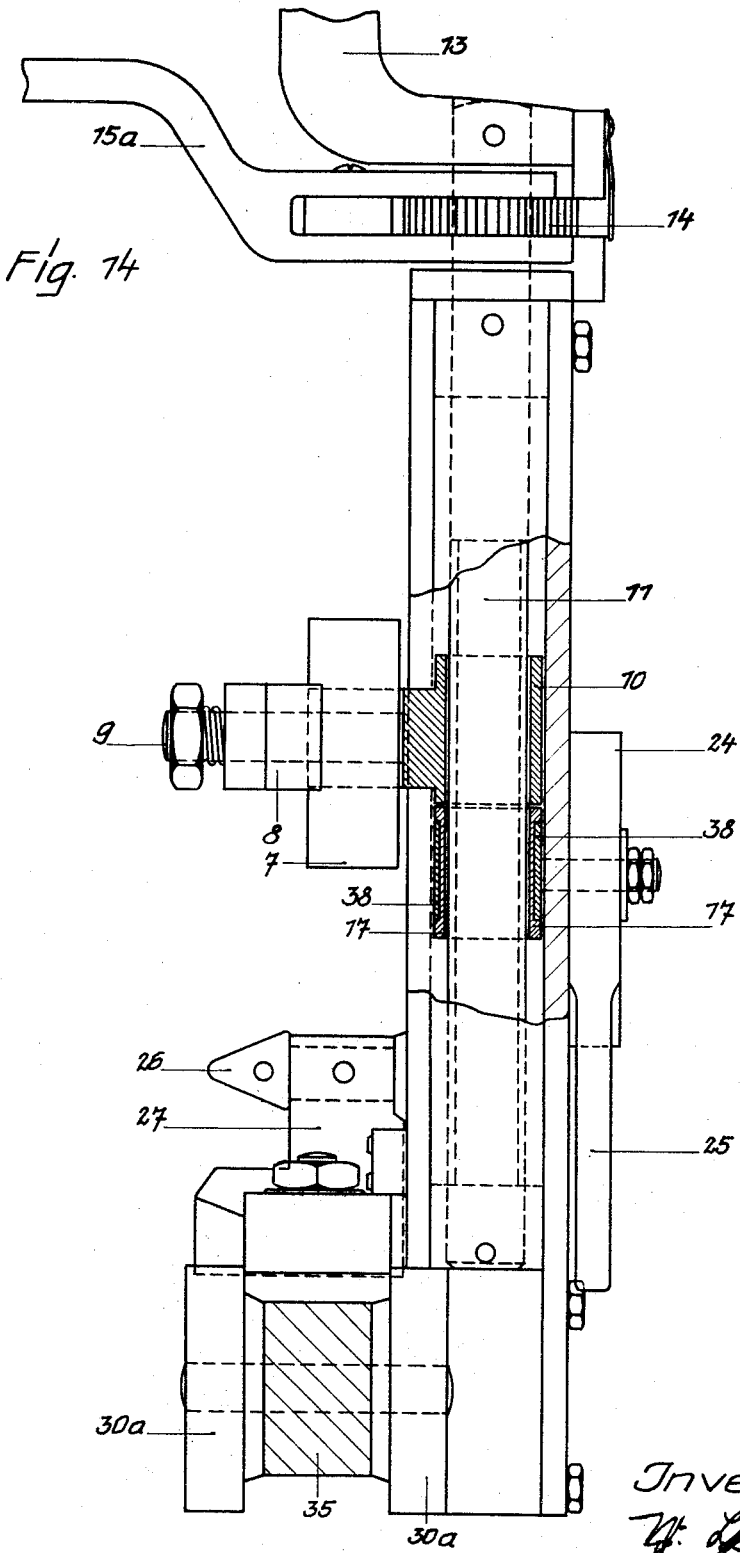

1,939,123

UNITED STATES PATENT OFFICE 1,939,123

TIGHTENING AND CLOSING DEVICE

Werner Löblich and Helmuth Löblich, Dresden, Germany

Application January 21, 1931, Serial No. 510,240, and in Germany March 25, 1929

2 Claims. (Cl. 81—9.1)

The present invention relates to a device for tightening and sealing metal bands surrounding cases, bales, and the like.

According to the invention, the device comprises tensioning means for tightening the band, deforming tools for deforming a sleeve surrounding the ends of the band and cutting tools for severing the band length required for sealing from the rest of the band. Compared with known devices, the invention affords the advantage that the deforming and cutting tools are operated by the motion of a single driving member, the severing of the band being effected only after the stamping of the sleeve has taken place, so that an extraordinarily tight closure is attained. For this purpose the cutting device comprises an upper knife firmly connected with the die and an abutment which is movable in the direction of stamping and lies between the two ends of the band, the front portion of the abutment carrying a companion die for the top knife. When the band is tightened, the sleeve is pressed against the abutment. During the depression of the driving member the upper die and top knife move down, so that the sleeve is pressed into the lower die. The movable abutment cooperates in this motion until the die has reached its lower end position shortly before completing its stamping work. At this moment the upper and lower dies begin to act and separate the projecting free end of the band. The sealing process is thus completed, and the device can be removed from the case or the like.

Two modifications of the invention are illustrated in the accompanying drawings, Figs. 1 to 8 and 14 illustrating a device suited for large bales and Figs. 9 to 13, a device adapted for small bales and packages. In the drawings, Figure 1 is a front view of the device; Figs. 2 and 3 are rear views thereof, Fig. 2 showing the device with the clamping sleeve open and Fig. 3, with the clamping sleeve closed; Figs. 4 and 5 represent a section on the line A—B of Figs. 2 and 3 respectively; Figs. 6 to 8, inclusive, are views of the closing sleeve with the transverse rib; Figs. 9 and 10, front views of the second modification; Fig. 11 is a rear view thereof; Fig. 12, a plan thereof; Fig. 13, a section on the line C—D of Fig. 12 and Fig. 14 a plan view of the device of Figs. 1 to 6.

Referring to the drawings, 1 is a case, 2 the band-iron having a free end 3, and 4 is the supply of band-iron. 5 is the closing sleeve to be sealed to the band by the formation of the transverse rib 6. 7 is an eccentric disc for clamping the band-iron 4. 8 is a lever for actuating the eccentric disc. By operating the lever 8 the disc 7 is turned about a shaft 9. The shaft 9 is carried by the slide 10 adapted to move to and fro over the spindle 11 which is rotatably arranged in the bracket or frame 13. The worm-spindle 11 carries the ratchet wheel 14. On the worm-spindle 11 is rotatably arranged a ratchet lever 15a with a pawl 15. 16 and 17 are clamping jaws having threaded parts 18 and 19 which are capable of cooperating with the spindle 11 so that by turning of the spindle 11 by actuating the lever 15a the jaws 16 and 17 are moved in the direction toward the lever 15a, the slide 10 and band support or carrier 36 being moved by the jaws 16 and 17 in the same sense. The jaw 16 carries two plates 38, and the jaw 17 possesses guides 38a, in which the plates 38 slide (Fig. 4). The two clamping jaws 16 and 17 are each provided with a pin 20 and 21 respectively, and these pins 20 and 21 slide in the grooves 22 and 23 of a disc 24, which has a handle 25. The disc 24 carries a pin 43. The covering plate 39 has 3 longitudinal slots 40, 41, 42 wherein the pins 20 and 21 attached to the jaws 16 and 17 and the pin 43 attached to the disc 24 slide.

The bracket or frame 13 carries a wedgelike abutment 27 adapted to oscillate about the pin 26. The abutment 27 is fitted with an edge 28 provided with an indentation 29. 30 is a deforming member in a casing 30a, carrying a rotatably arranged handle 35. The deforming member 30 carries a knife 31, the cutting edge of which is inclined as shown at 32 in Fig. 8. 33 is the matrix in the deforming member for the formation of the transverse rib 6. 34 is the cut-off remaining end of the band-iron. 37 is a spring for moving the slide 10 into its initial position.

The device functions as follows:

If the case 1 is to be sealed by means of the band-irons 2 and 4, the closing sleeve 5 is slipped over the band-iron 4, the band-iron 2 placed around the case 1, and the free end run again through the sleeve 5 and bent back upon itself. The band-iron is drawn as tight as possible by hand around the case. The device is placed with the bracket 13 on the case. The sleeve 5 is then arranged under the stamp 30 so that the oscillatory wedgelike abutment 27 is located between the running band 4 and the band-iron 2. The next step is to clamp the running band 4 in position between the eccentric disc 7 and the carrier 36 on the slide 10 by actuating the lever 8, whereupon the handle 25 is brought into the position shown in Fig. 3 so that the jaws 16 and 17 with their threaded portions 18 and 19 cooperate with the spindle 11. By actuating the lever 15a the pawl 15 cooperates with the ratchet 14. By turning of the spindle 11, the member 38 with the clamping jaws 16 and 17 is displaced to the left (drawn back) the pins 21, 22 attached to the jaws sliding in the longitudinal slots 40 and 41 while pin 43 to which disk 24 is attached slides in slot 42. By this motion the slide 10 with the disc 7, the carrier 36 and the band 4 are moved with the result that the band 4 is tightened around the case 1. After the tightening, the punch 30 is depressed by means of the handle 35 to press at first the transverse rib 6 into the sleeve 5 and the bands 2 and 3 by means of the die 33. When the member 30 is pressed down still more, the point 32 of the knife 31 will come into contact with the running band 4 and cut it off by entering the indentation 29 of the wedgelike abutment 27. Then the arm 35 is turned back and also the arm 8 of the eccentric disc 7. The band with the sleeve is now free, so that the device may be removed from the case. Then the jaws 16 and 17 are opened by turning the lever 25 with the disc 24, whereupon the slide 10 actuated by the spring 37 moves again into its initial position. The outer free end 34 of the band-iron is then bent, as shown in Fig. 7, in the interest of safety.

In the second modification intended only for small cases and postal parcels 44 is a bar firmly connected with the clamping device 45, the eccentric disc 46, and the lever 47. The tensioning device 48 is displaceably disposed on the bar 44 which, on its surface, forms the rack 49 engaged by the pawl 51 and the lever 55 adapted to rotate about the pin 60. The pawl 51 is rotatably arranged to rotate on the pin 53 of the lever 55 and is actuated by the spring 52 and provided at the other end with a nose 54. The shaft 60 and the lever 55 control the motion of the lever 51. In the shank of the lever 55 a rod 56 actuated by the spring 57 and provided with a knob 58 is disposed and has an arm 59 which can be brought into engagement with the nose 54. The shaft 60 carries a disc 60a with a hole 61 which may be engaged by the lower end 62 of the rod 56. The shaft 60 carries further the firmly connected cam 63 which actuates the pressing and cutting tool 64 formed as described in the first example. 65 is a spring for returning the tensioning device to its original position. 66 is also a spring which returns the pressing and cutting tool 64 to its initial position. 50a is a pawl which prevents the return motion of the rack 44 under the influence of the spring 65.

This second modification functions as follows:
To fix band-iron around the case 1, the clamping device 45 and the tensioning device 48 are closely pushed together. Then the closing sleeve 5 is provided in the manner described with the band-iron 2 so that the oscillatory wedgelike abutment 27' is placed between the band 2 and the running band 4 which is clamped by means of the device 45. The lever 55 and the pawl 51 are in the positions shown in Figs. 10 and 11, i. e., the rod 56 with its lower end 62 is supported by the circumference of the disc 60a. By actuating the lever 55 the pawl 51 advances bar 44 and rack 49 and as the rack bar 44 is connected with the clamping device 45 the result is that the band-iron is tightened. If a sufficient degree of tension has been attained, the lever 55 is placed in perpendicular position so that the rod 56 actuated by the spring 57 will engage with its lower end 62 the hole 61 of the disc 60a. In the meantime, the arm 59 has carried out a downward motion also and is disposed over the nose 54. When the lever 55 is moved down again, the arm 59 will press on the nose 54, lift the pawl 51 out of the rack 49, and, by means of the cam 63, the pressing and cutting tool 64 is pressed down against the sleeve 5, the pressing and cutting operations taking place simultaneously when the matrix 33' presses the transverse rib into the sleeve 5 and the point 32' of the knife 31' engages the indentation 29' of the wedgelike abutment 27'. When the case has been closed, the clamping device is released by actuating the pawl 50a and brought back into its initial position by the spring 65. By withdrawing the knob 58 the rod 56 is pulled out of the hole 61 of the disc 60a and the arm 59 brought out of engagement with the nose 54. The spring 52 then presses the pawl 51 again into the teeth 49 of the rack 44.

The second modification is of a much more simplified and handier type and capable of carrying out the three operations of tightening, closing and cutting the band in one operation and by means of one lever. Moreover, both the sealing and the cutting tools are actuated in one operation at the same time.

We claim:

1. A device for securing a metal band around an article comprising strap tensioning and deforming means, a severing knife carried by the said deforming means and a pivoted abutment recessed to cooperate with the edge of the knife and swingable with the downward movement of the knife and the deforming means until the strap is forcibly held by the said deforming means when the knife and abutment cooperate in severing the strap.

2. A device for securing a metal band with a sleeve around an article comprising strap tensioning and deforming means and a severing knife carried by the said deforming means, a pivoted abutment recessed to cooperate with the edge of the knife and swingable with the downward movement of the knife and the deforming means until the strap is forcibly held by the said deforming means when the knife and abutment cooperate in severing the strap, a bracket holding the sleeve and one end of the band connected to said sleeve, a clamping device to hold the tensioning means in their tightening positions, an actuating lever for the said tensioning means, said deforming means being shaped to form transversely extending ribs in the sleeve and the two ends of the band and the said knife cooperating with the recessed abutment to cut off the second end of the band.

WERNER LÖBLICH.
HELMUTH LÖBLICH.